US006886584B2

(12) United States Patent
Turvey

(10) Patent No.: US 6,886,584 B2
(45) Date of Patent: May 3, 2005

(54) METHOD AND ASSEMBLY OF REPLACING RECEPTACLE SEAL

(75) Inventor: James Turvey, Costa Mesa, CA (US)

(73) Assignee: Argo-Tech Corporation Costa Mesa, Costa Mesa, CA (US)

(*) Notice: Subject to any disclaimer, the term of this patent is extended or adjusted under 35 U.S.C. 154(b) by 0 days.

(21) Appl. No.: 10/349,553

(22) Filed: Jan. 23, 2003

(65) Prior Publication Data

US 2004/0144422 A1 Jul. 29, 2004

(51) Int. Cl.[7] .......................... B23P 19/00; B23P 19/04

(52) U.S. Cl. ............................... 137/315.41; 29/221.6; 29/235; 29/402.08; 137/15.18

(58) Field of Search .......................... 137/15.18, 15.22, 137/315.41, 614.04; 29/213.1, 221.6, 235, 267, 402.02, 402.08; 251/149.6; 277/323, 370, 376, 598, 609

(56) References Cited

U.S. PATENT DOCUMENTS 1,968,640 A * 7/1934 Elms .......................... 29/235
3,180,015 A * 4/1965 Thompson et al. ........... 29/235
3,577,848 A * 5/1971 Mengle ....................... 29/235
3,920,036 A * 11/1975 Westenrieder .......... 137/315.21
4,813,120 A * 3/1989 Fournier .................... 29/426.6
4,944,081 A * 7/1990 Ross .......................... 29/235
5,299,347 A * 4/1994 Decker ....................... 29/235
5,406,683 A * 4/1995 Arnold ........................ 29/235
5,406,685 A * 4/1995 Harmand ..................... 29/235
5,429,155 A 7/1995 Brzyski et al.
5,564,175 A * 10/1996 Nejad .......................... 29/235
5,787,561 A * 8/1998 Harmand ..................... 29/235
5,974,646 A * 11/1999 Cotter ......................... 29/235
5,975,104 A * 11/1999 Wilkins .................. 137/15.22

* cited by examiner

*Primary Examiner*—George L. Walton
(74) *Attorney, Agent, or Firm*—Fay, Sharpe, Fagan, Minnich & McKee, LLP

(57) ABSTRACT

A method and assembly of replacing a receptacle seal is provided. A seal removal kit includes a poppet depressing member, retaining collar, seal removing tool, and a seal insertion sleeve that allows the seal to be replaced without removal of the receptacle or portions thereof from a vehicle.

13 Claims, 12 Drawing Sheets

METHOD AND ASSEMBLY OF REPLACING RECEPTACLE SEAL

BACKGROUND OF THE INVENTION

This application relates to the field of fluid couplings, and particularly to a receptacle or female half of a coupling adapted to handle fluids, for example from heating, freezing or even cryogenic temperatures. More particularly, the invention relates to a method for replacing the valve seal, as well as an assembly for removing the seal.

U.S. Pat. No. 5,429,155—Brzyki, et al. is generally related to a fluid coupling and finds particular use in handling cryogenic fluids such as liquefied natural gas (LNG). That patent is owned by the assignee of the present application and the disclosure is hereby incorporated by reference. Briefly, and as set forth in greater detail in the '155 patent, transfer of cryogenic fluid such as LNG poses special problems because of the freeze-up and potential leakage as a result of ice formation at the sealing surfaces. That patent uses a washer or scraper to facilitate removal of ice and thereby improve sealing characteristics of the coupling.

Whether handling cryogenic fluids or not, all seals over time are subject to potential leakage. It would be ideal if the seal could be readily removed from the system with which the coupling half or receptacle is associated without having to remove or disassemble the receptacle on a poppet type valve normally biased toward a closed position. This seal provides an effective shutoff when the coupling halves are disassembled and, upon makeup of the coupling, the poppet valve is urged from its associated seat to form a flow path of sufficient capacity to allow a high flow rate of fluid through the coupling.

In many instances, it has heretofore been required to remove the receptacle from the vehicle to replace a seal. In other instances, a portion of the receptacle must be disassembled to attain access to the valve poppet for seal replacement. As noted above, for maintenance and servicing, it would be desirable to easily and effectively replace seals of this type without having to disassemble or remove the receptacle from the vehicle or tank.

SUMMARY OF THE INVENTION

The present invention provides a method and an assembly for replacing a seal of an associated fluid coupling receptacle without removing the receptacle from an associated housing structure.

In an exemplary embodiment, the assembly includes a poppet depressing member configured for mounting on the body extends through the bore into selective engagement with the poppet member. A seal removing member or seal removal tool selectively engages a worn seal through the bore when the poppet member is spaced from the valve seat via the poppet depressing member. Once the worn seal is removed, a new seal is advanced into the bore and inserted over the poppet member.

A method of replacing a worn seal of a fluid coupling comprises the steps of moving the poppet member from the valve seat through the open end of the bore, extracting the worn seal from the poppet member, advancing a new seal through the bore from the open end thereof, installing the new seal on the poppet member, and allowing the poppet member to freely move relative to the valve seat.

Still other features and benefits of the invention will become apparent to one skilled in the art upon reading and understanding the following detailed description.

DETAILED DESCRIPTION OF THE INVENTION

Figure 1:
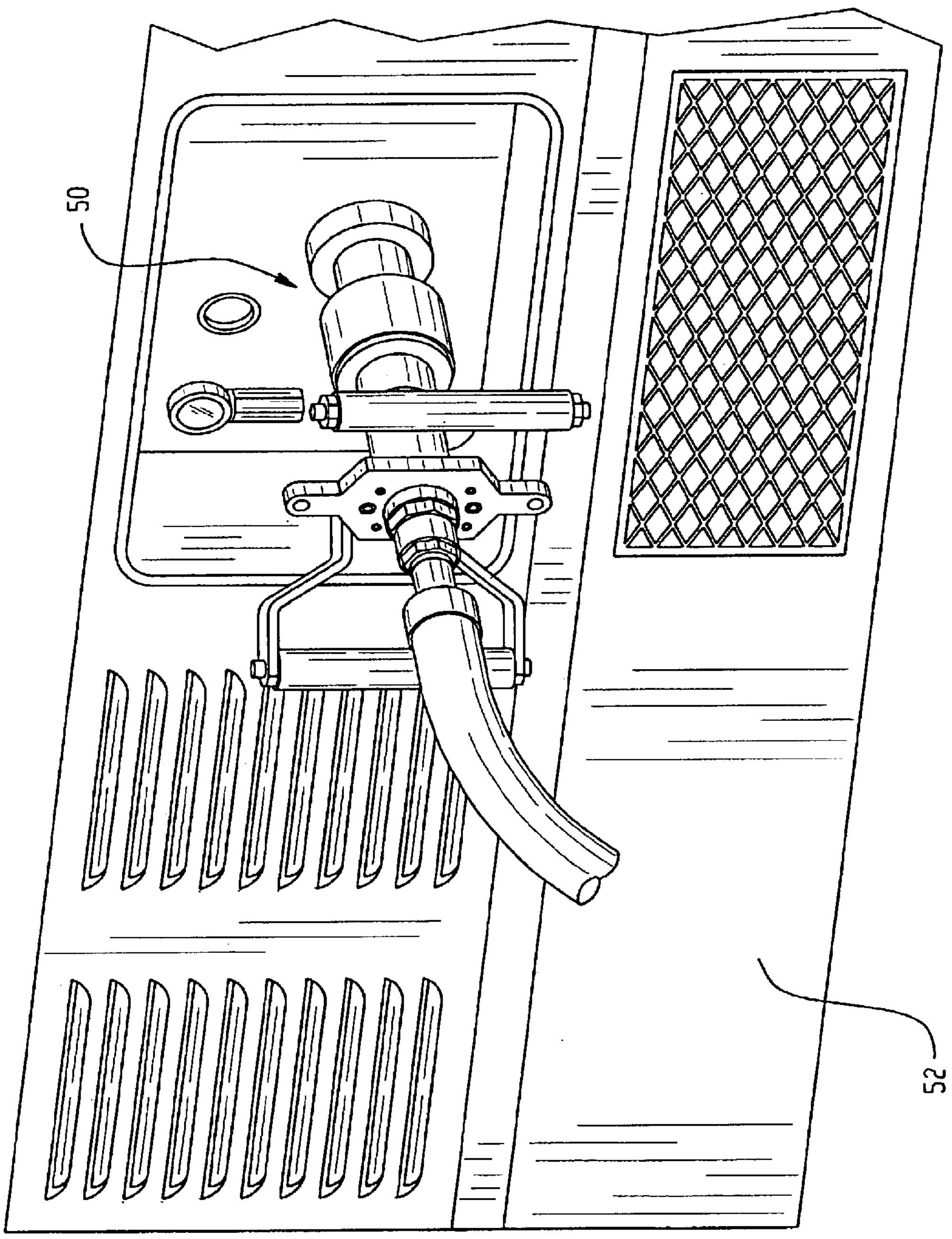
FIG. 1 is photograph illustrating use of a coupling to supply LNG fuel to a vehicle.
Figure 2:
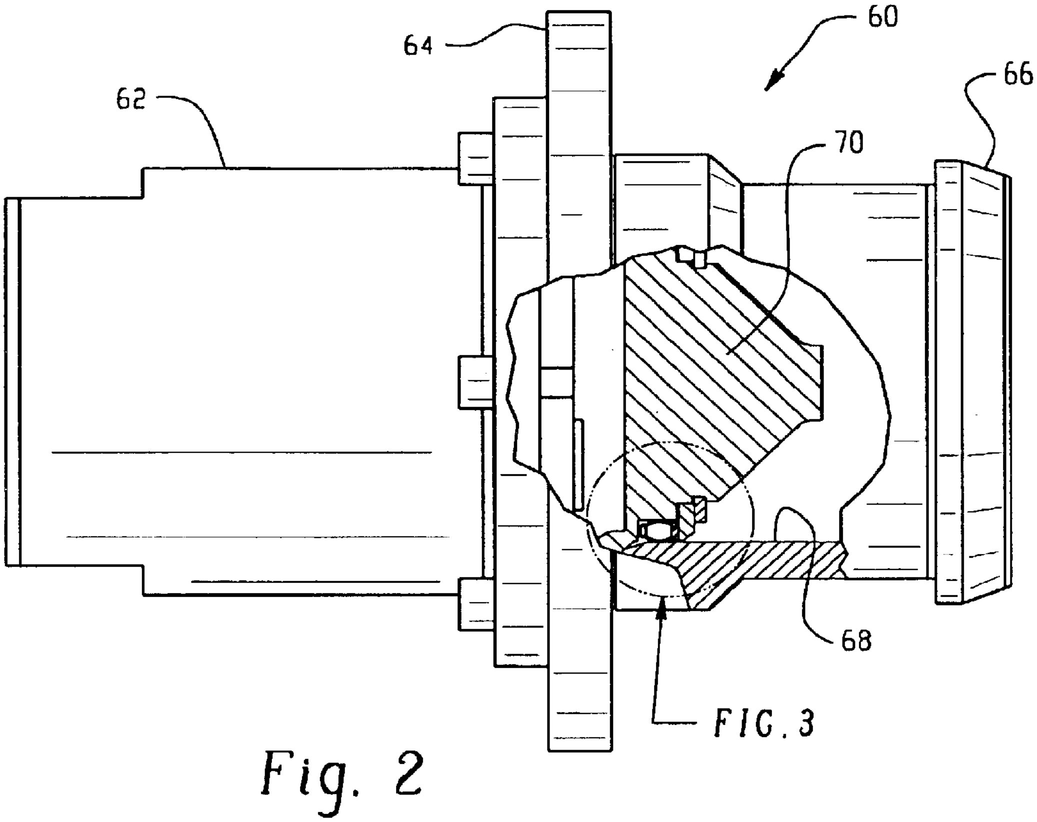
FIG. 2 is an elevational view partly in cross-section of a female coupling portion or receptacle.
Figure 3:
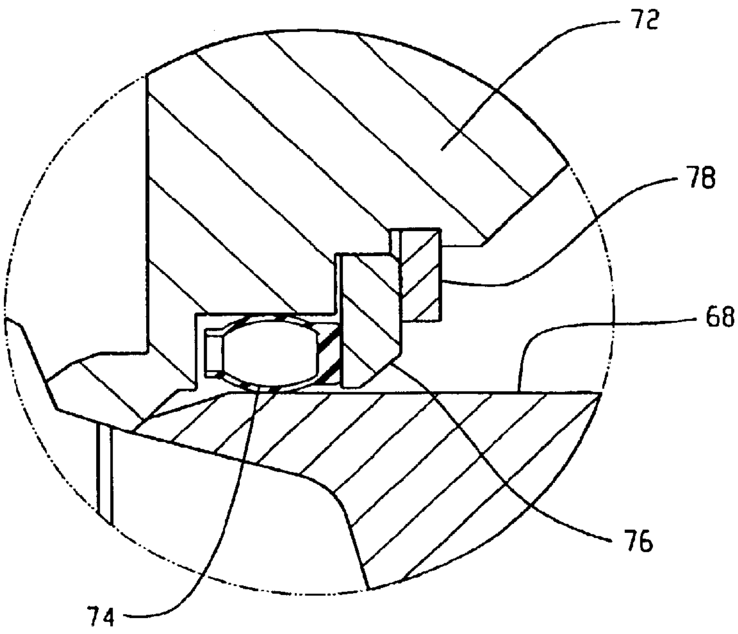
FIG. 3 is an enlarged sectional view of the seal assembly on the poppet valve of FIG. 2.

With initial reference to FIG. 1, a coupling 50 is illustrated to supply fuel, here LNG, to a mass transit vehicle such as a bus 52. Again, the particular details of this type of coupling are shown and described in U.S. Pat. No. 5,429,155. The male coupling component or nozzle 54 is of the type disclosed in the '155 patent. More particularly, and as shown in FIGS. 2 and 3, a female coupling half or receptacle 60 includes a body 62 that includes a mounting flange 64 that aids in mounting the coupling component to a housing, bulkhead, vehicle, wall, etc. An outer end of the receptacle includes a shoulder 66 and a bore 68 extends inwardly therefrom to define a portion of a flow passage through the coupling component when poppet valve 70 is in an open position. The poppet valve includes a body 72 which has a series of radially inward extending, circumferentially continuous grooves that receive a seal 74, optionally a seal retainer 76, which also serves as an ice scraper as disclosed in the '155 patent, and a retaining ring 78. In the preferred embodiment, the ice scraping feature provided by seal retainer ring 76 is desired, although it will be appreciated that in some instances, this feature can be eliminated and the seal 74 maintained in place by a radially enlarged retaining ring that abuts against the seal.

Figure 4:
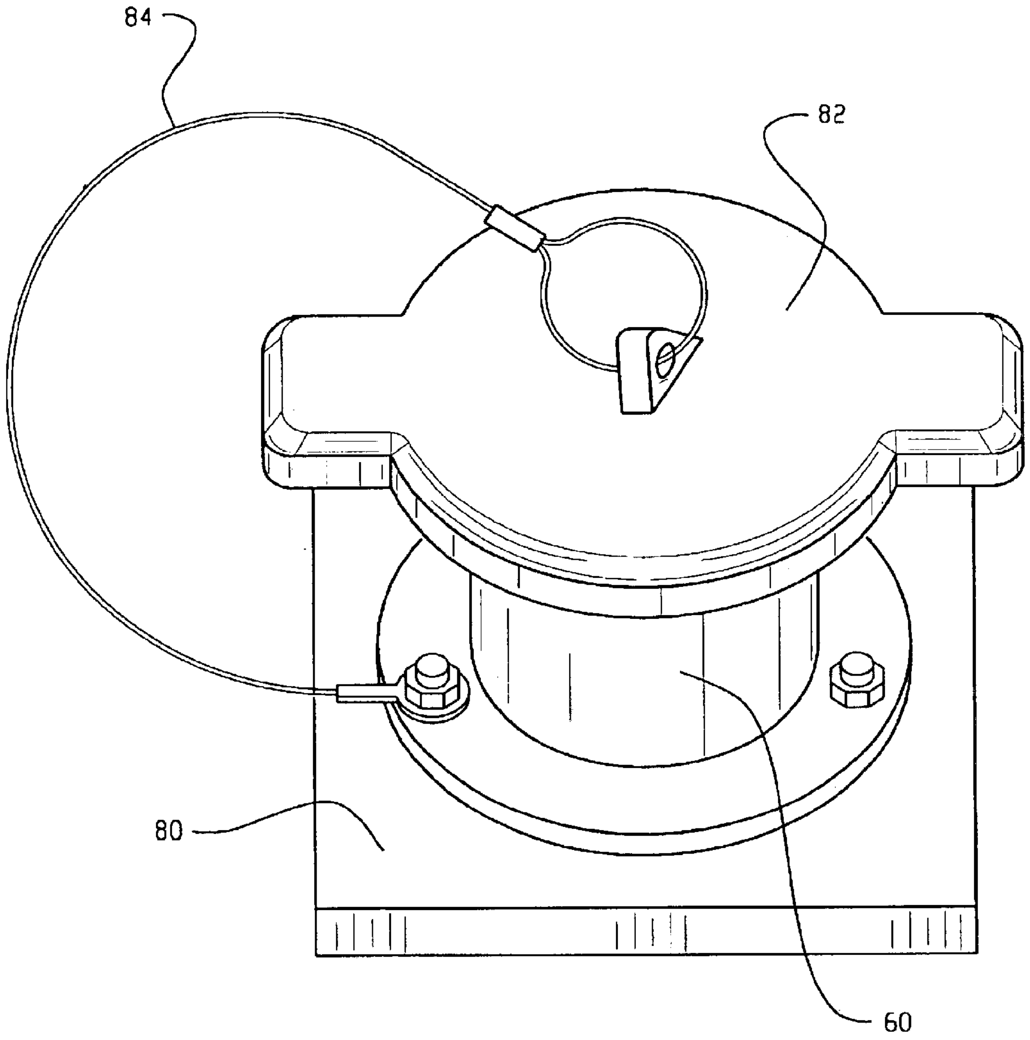
FIG. 4 is an illustration of a bench sample receptacle with a dust cover in place.

FIG. 4 illustrates a receptacle 60 mounted on a test bench 80 and further including a dust cover or cap 82 that is secured over the shoulder 60 of the receptacle. A strap or tether 84 is secured to the flange 64 at one end and the cap at the other end to retain the cap when removed from the receptacle.

Figure 5:
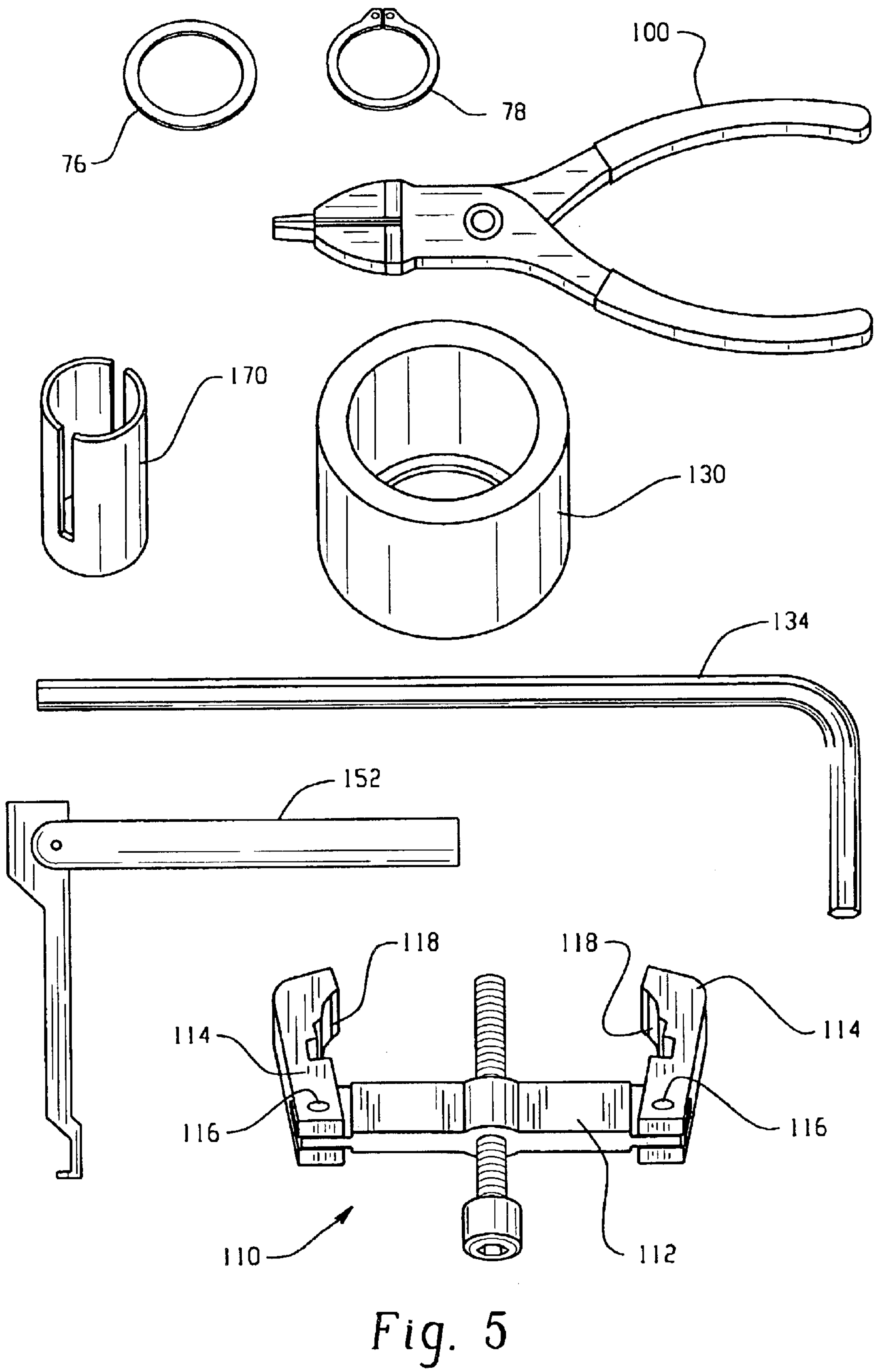
FIG. 5 illustrates the individual tools of a poppet seal removal kit.

FIG. 5 illustrates the various tools used in the present invention to replace the seal 74 in the poppet. The seal retainer 76 is shown adjacent a retaining ring 78 that has been removed with a tool such as snap ring pliers or similar tool 100. Removal of the retaining ring 78 with such a tool is well known and individually forms no part of the present invention. However, removal of the seal 78 from its associated groove in the poppet body requires that the ring be radially expanded from the groove and then axially retracted through the bore 68 while accessed from the shoulder end of the receptacle. Once the ring 78 has been extracted, the seal retainer 76 is easily removed from the shoulder end of the receptacle by sliding it outwardly along the bore 68.

Figure 6:
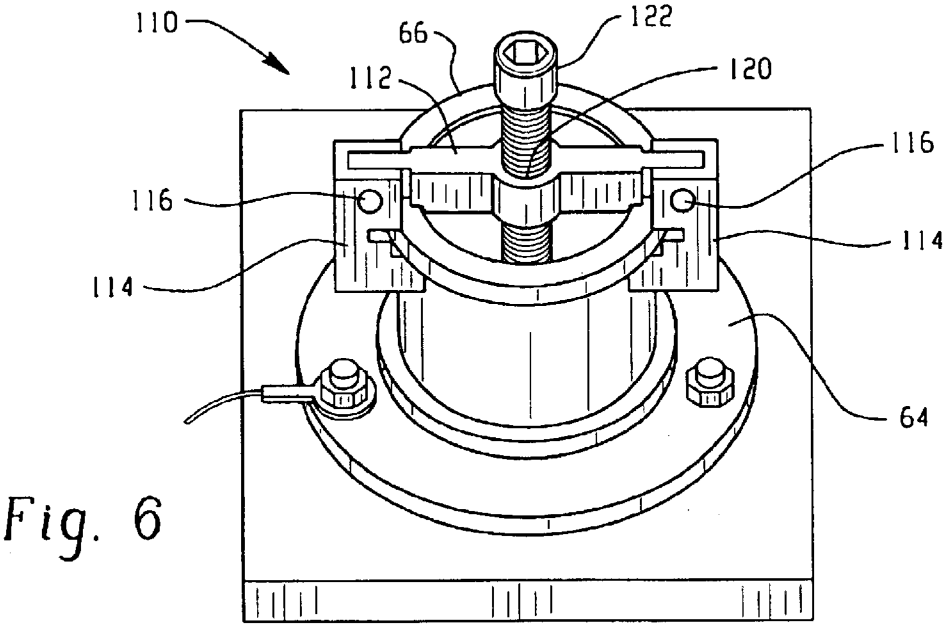
FIG. 6 illustrates the installation of a poppet depressing tool on the open end of the receptacle.

FIG. 6 illustrates the removal of the dust cap from the open end of the receptacle. A poppet depressing tool 110 (see FIGS. 5 and 6) is then installed over the shoulder of the receptacle. More particularly, the poppet depressing tool includes a cross member 112 that has first and second locking members or locking dogs 114 pivotally mounted at opposite ends thereof. The locking members selectively rotate to allow the recessed conformation 118 provided on the inner portion of each locking member to be moved radially outward and over the shoulder of the receptacle. The cross member then rests along the outer terminal end of the receptacle as illustrated in FIG. 6 and may include a shoulder engagement with the bore 68 for centering purposes if so desired. Once the locking members 114 have rotated inwardly as shown in FIG. 6, the poppet depressing tool is firmly engaged over the shoulder. The threaded opening 120 receives a poppet depressing member 122 through a central portion of the cross member. Thus, as illustrated in FIG. 6, the depressing member 122 is initially located at an outer axial position when the poppet depressing tool 110 is mounted on the receptacle.

Figure 7:
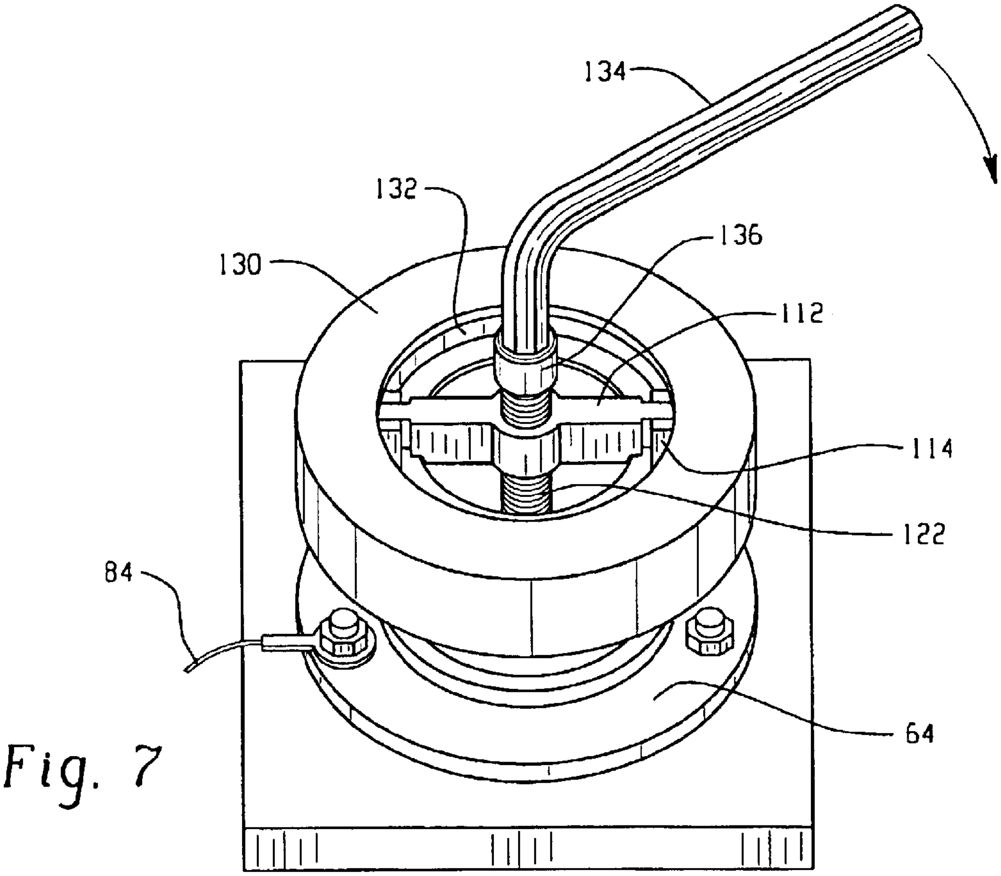
FIG. 7 is a view similar to FIG. 6 with the retaining ring and torque tool in position.
Figure 8:
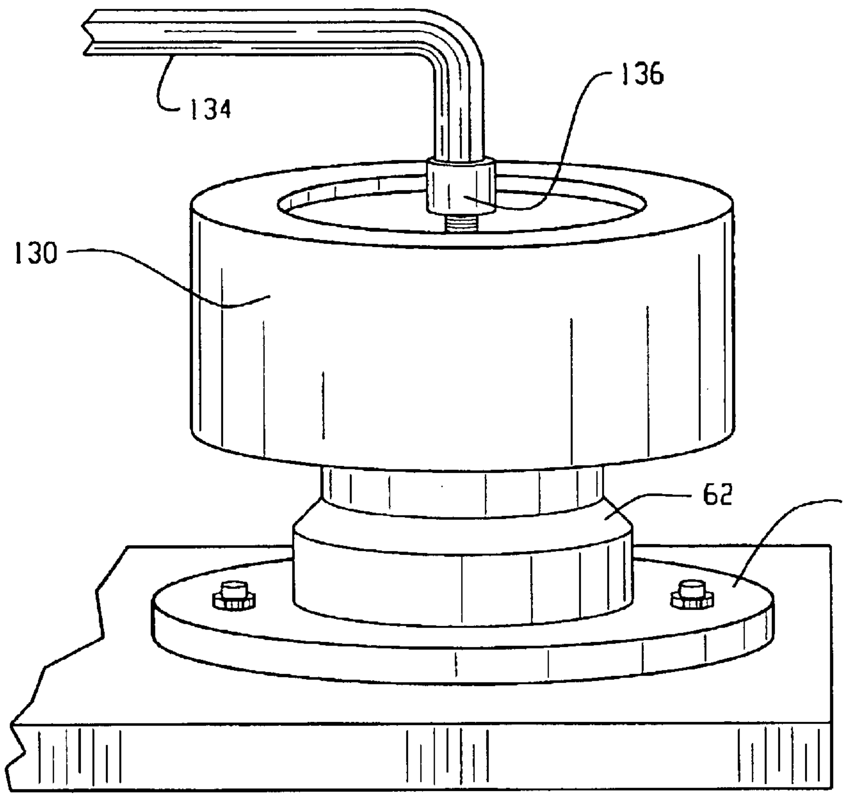
FIG. 8 illustrates a side view of the assembly of FIG. 7 with the poppet depressing member fully depressed.

As shown in FIG. 7, a retaining collar 130 is next inserted over the open end of the receptacle and in circumferentially surrounding relation with the poppet depressing tool 110. More particularly the annular retaining collar 130 has an inner diameter 132 sufficiently sized to extend over the outer end of the receptacle and more particularly is closely dimensioned for mating receipt around the locking members 114. Once the collar is installed over the poppet depressing tool, the locking members maintain their gripping engagement via the configured recess 118 over the shoulder 66 of the receptacle. A torque tool such as wrench 134 includes tool engaging surfaces or flats that cooperate with mating tool engaging surfaces or flats on the depressing member 122. Once the collar is in place, the torque tool is rotated so that the poppet depressing member 122 is advanced axially into the bore of the receptacle for engagement with the poppet body. As will be appreciated, initial engagement of the depressing member 122 with the poppet body slowly relieves any pressure trapped behind the poppet valve. The torque tool is rotated until a stop surface Such as shoulder 136 on the depressing member engages the cross member 112. Once this occurs, the operator/user can be assured that the poppet has been fully depressed so that seal removal can continue. The fully depressed position is also illustrated in the elevational view of FIG. 8. One skilled in the art will also appreciate that the retaining collar 130 is shown as being elevated above the receptacle flange 64. This is not necessarily required, so long as the locking members 114 are radially restrained by the collar, i.e., the collar can slide into abutting engagement with the flange 64 if desired.

Figure 9:
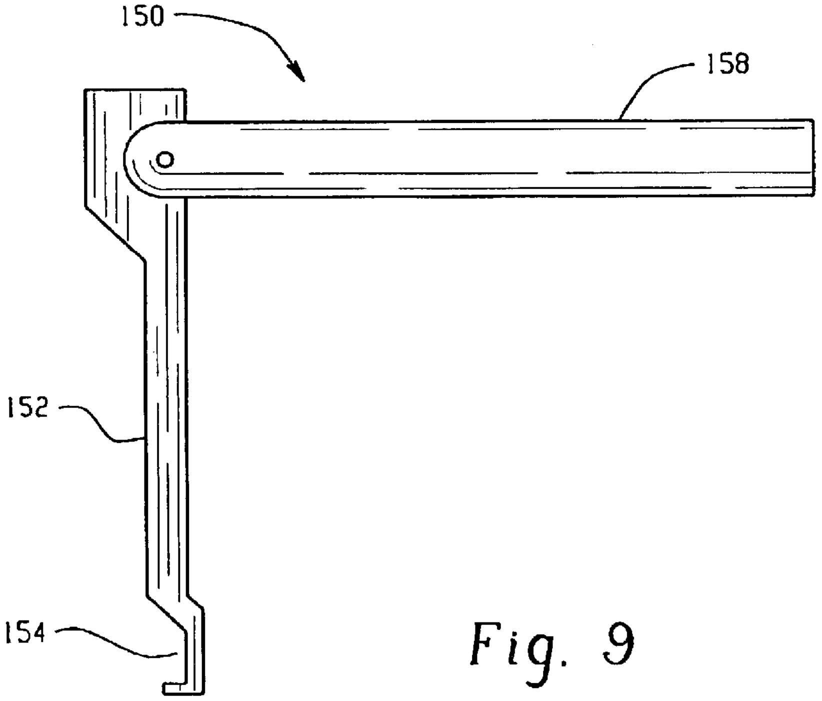
FIG. 9 is a photograph of a preferred form of seal removal tool.
Figure 10:
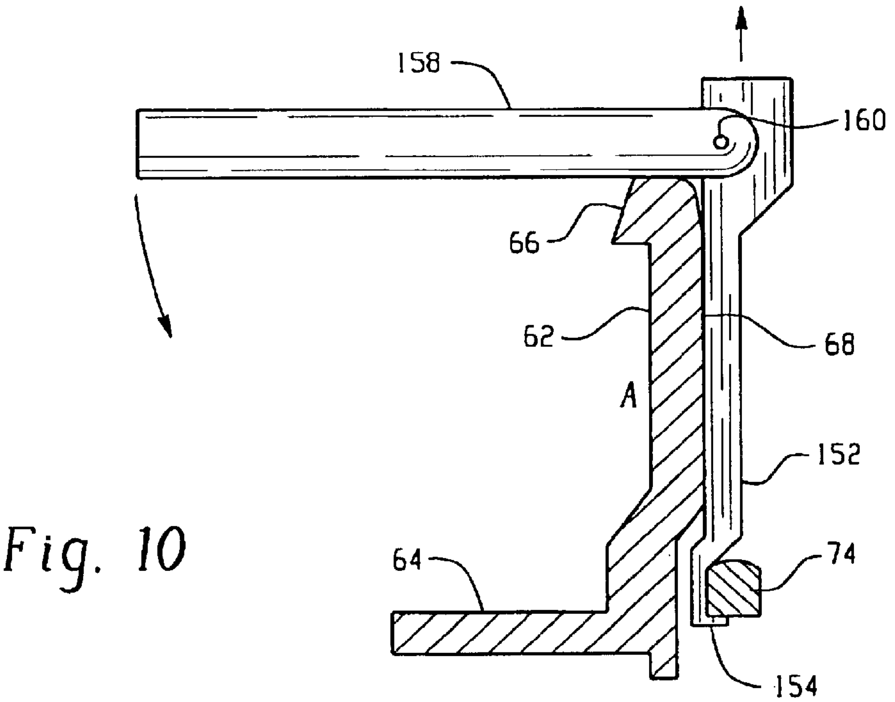
FIG. 10 is a schematic representation of the seal removal tool of FIG. 9 engaging a poppet seal to be disposed within the receptacle.

FIGS. 9 and 10 more particularly illustrate a seal removal tool 150. The tool includes a first member or arm 152. As shown in FIGS. 9 and 10, the first arm of the seal removal tool includes a hook-shaped end 154 configured and dimensioned for receipt around the seal whereby a lower axial surface and radially outer portion of the seal is engaged by the seal removal tool and lifted or pried from the poppet body (not shown in FIG. 10). The removal of the seal occurs once the poppet body has been moved away from the tapered valve seat 156. It will be appreciated that the poppet depressing tool 110 and retaining collar have been removed from the schematic representation of FIG. 10 in order to simplify the drawing and facilitate understanding of the invention. Once the hook end 154 is received beneath the outer edge of the seal 74, a second arm 158 is depressed to vertically lift the seal because of the pin or hinged arrangement 160 between the first and second arms of the seal removal tool, and use of the shoulder or retaining collar as a fulcrum.

Figure 11:
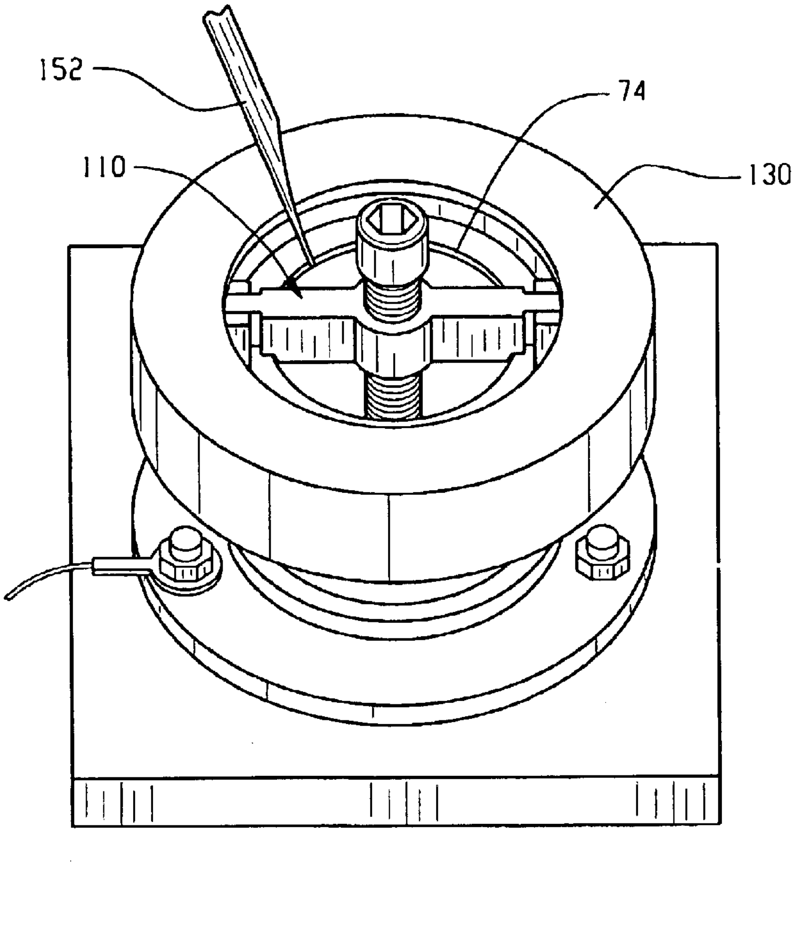
FIG. 11 illustrates the initial separation of the seal from the poppet during the removal process.
Figure 12:
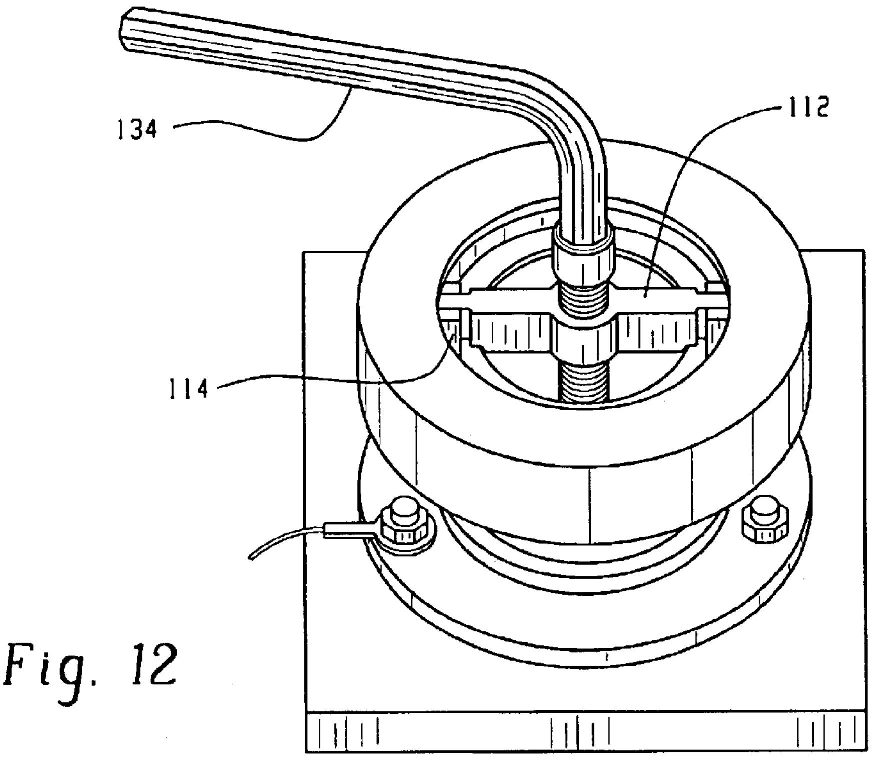
FIG. 12 illustrates the removal of the opening force from the poppet valve.
Figure 13:
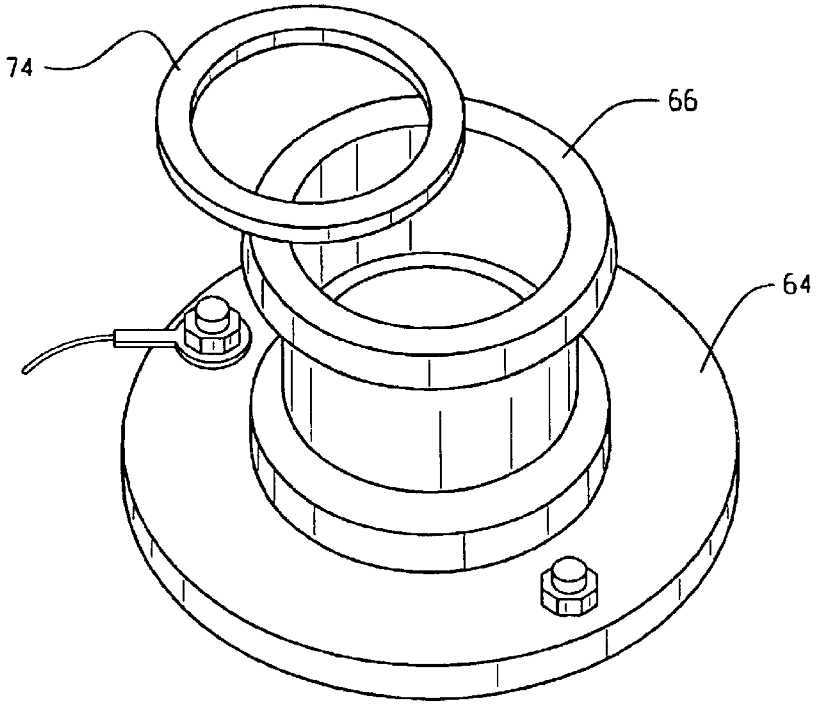
FIG. 13 illustrates the removal of the separated seal from the receptacle.

As represented in FIG. 11, the seal then "pops" off of the poppet body but is still trapped beneath the poppet depressing tool 110 and contained within the bore 68 of the receptacle. As further illustrated in FIG. 12, the torque tool is used to permit the poppet to engage against the seat. Then as demonstrated in FIG. 13, the retaining collar and poppet depressing tool are removed from the receptacle so that the old seal 74 can be extracted from the bore of the receptacle.

Figure 14:
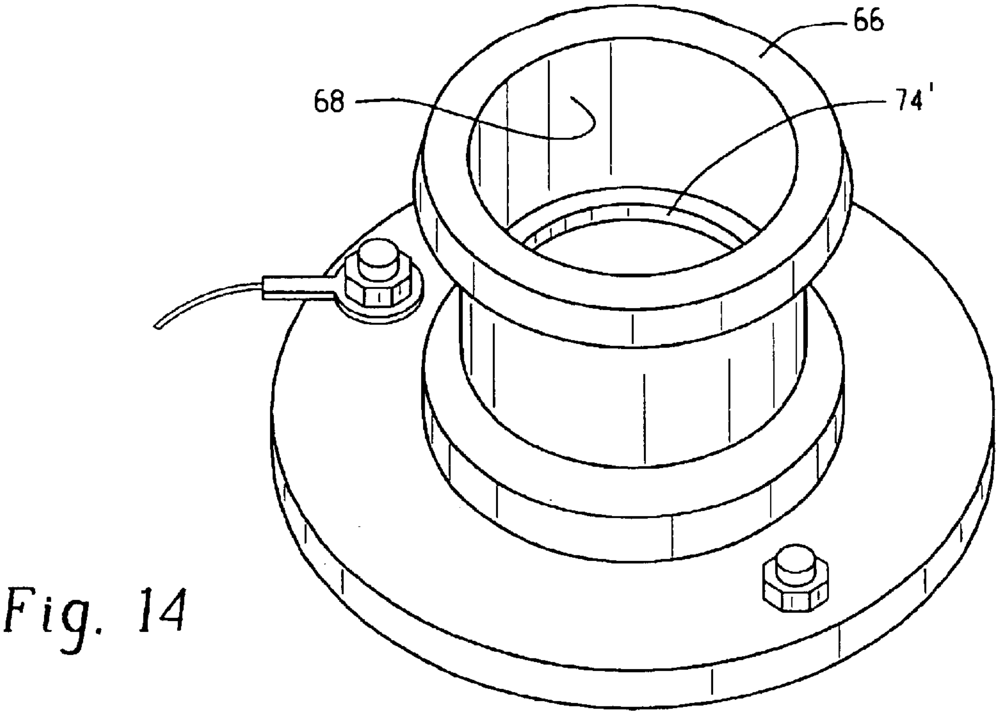
FIG. 14 illustrates insertion of a new seal into the receptacle.
Figure 15:
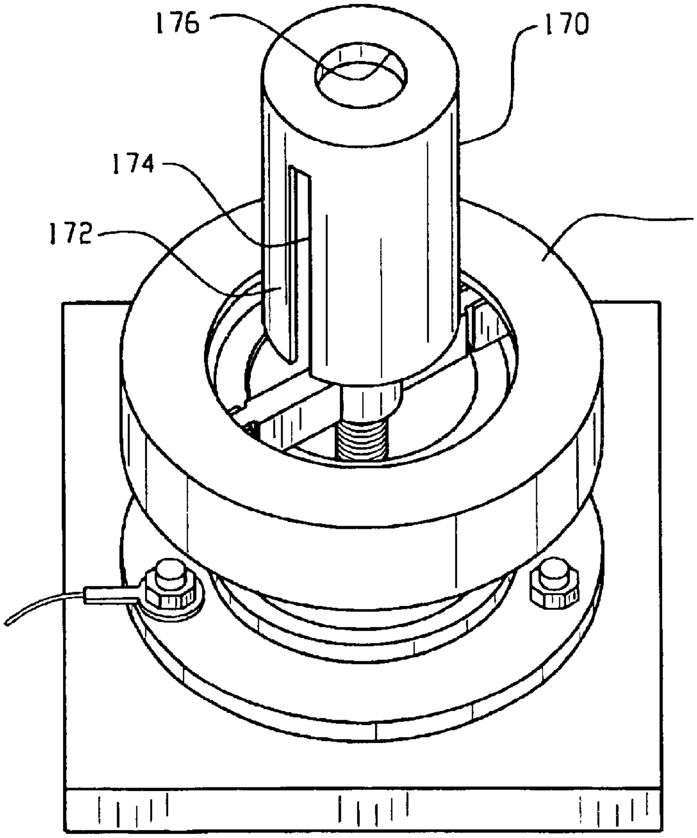
FIG. 15 illustrates the insertion of a sleeve for facilitating advancement of a seal onto the poppet.
Figure 16:
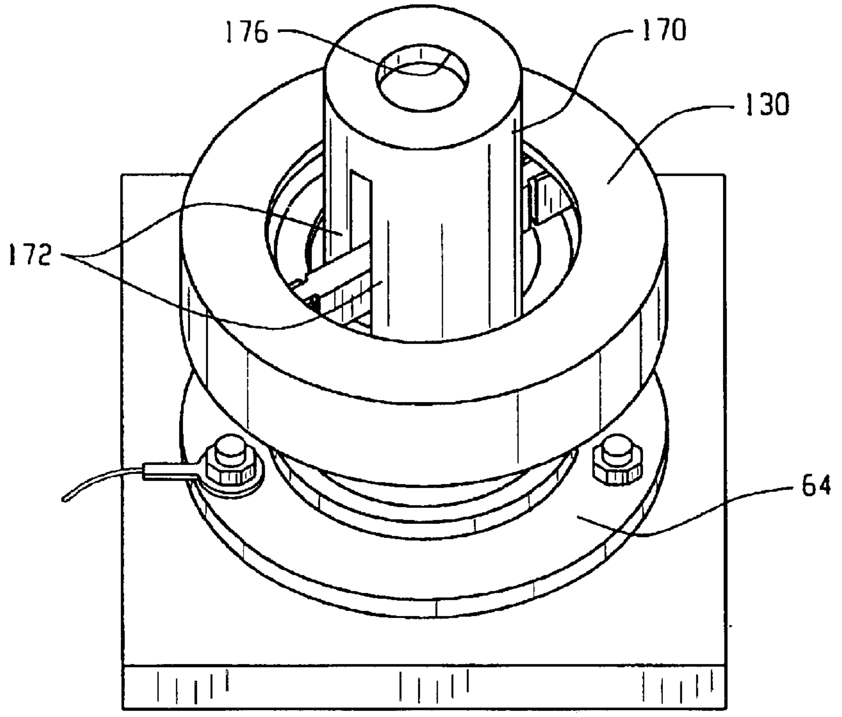
FIG. 16 illustrates the further advancement of the sleeve into the receptacle bore.
Figure 17:
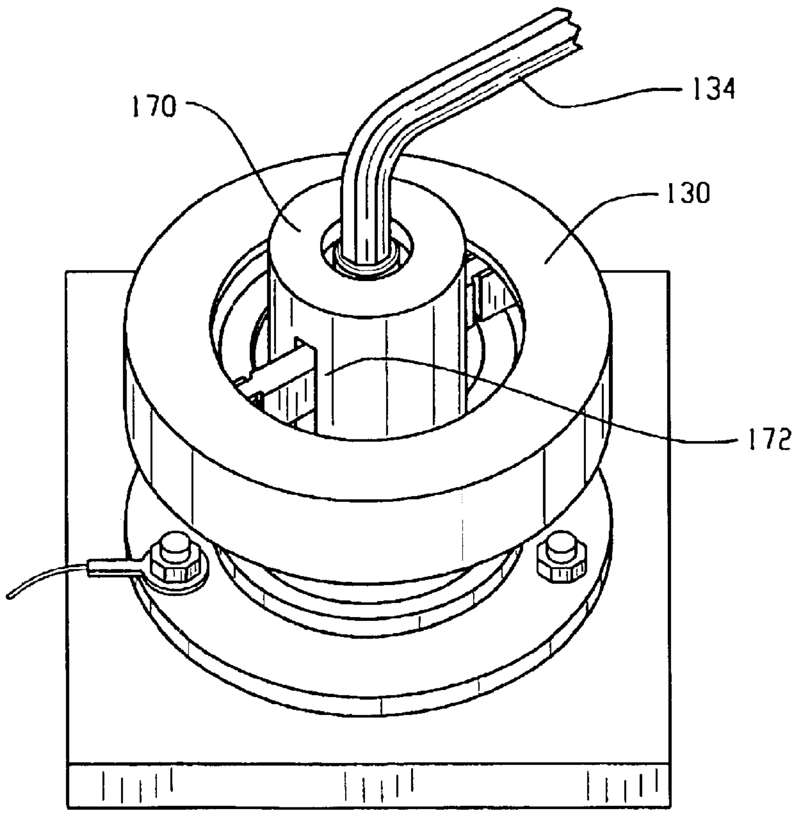
FIG. 17 illustrates installation of a torque tool for depressing the poppet valve away from its seat whereby the seal can be positioned on the poppet.

As illustrated in FIG. 14, a new seal 74' is then inserted into the bore 68. The poppet depressing tool 110 and retaining collar 130 are then reinstalled on the outer end of the receptacle. A seal engaging sleeve 170 is then inserted into the bore of the receptacle. More particularly, the sleeve 170 includes leg portions 172 separated by axial recesses 174 that allow the legs to extend inwardly into the receptacle bore and around the cross member 112 of the poppet depressing tool. Likewise, the sleeve has a sufficient axial length that accommodates the depressing member 122 in its outer, extended position. In FIG. 16, the sleeve has been axially advanced, and likewise the seal, to a location where the sleeve and seal engage the poppet body. The torque tool 134 is then inserted through opening 176 in the end of the sleeve so that the poppet is incrementally moved away from the valve seat, and the new seal incrementally advanced into position in its associated groove on the poppet body. For example, the torque tool 134 can be rotated (e.g., once or twice) to incrementally advance the poppet body away from the valve seat and then the sleeve advanced forwardly to urge the sleeve into abutting engagement with the new position of the poppet body. By repeating this incremental advancement, the seal is ultimately advanced into place into its associated groove when the poppet body is spaced from the valve seat.

Figure 18:
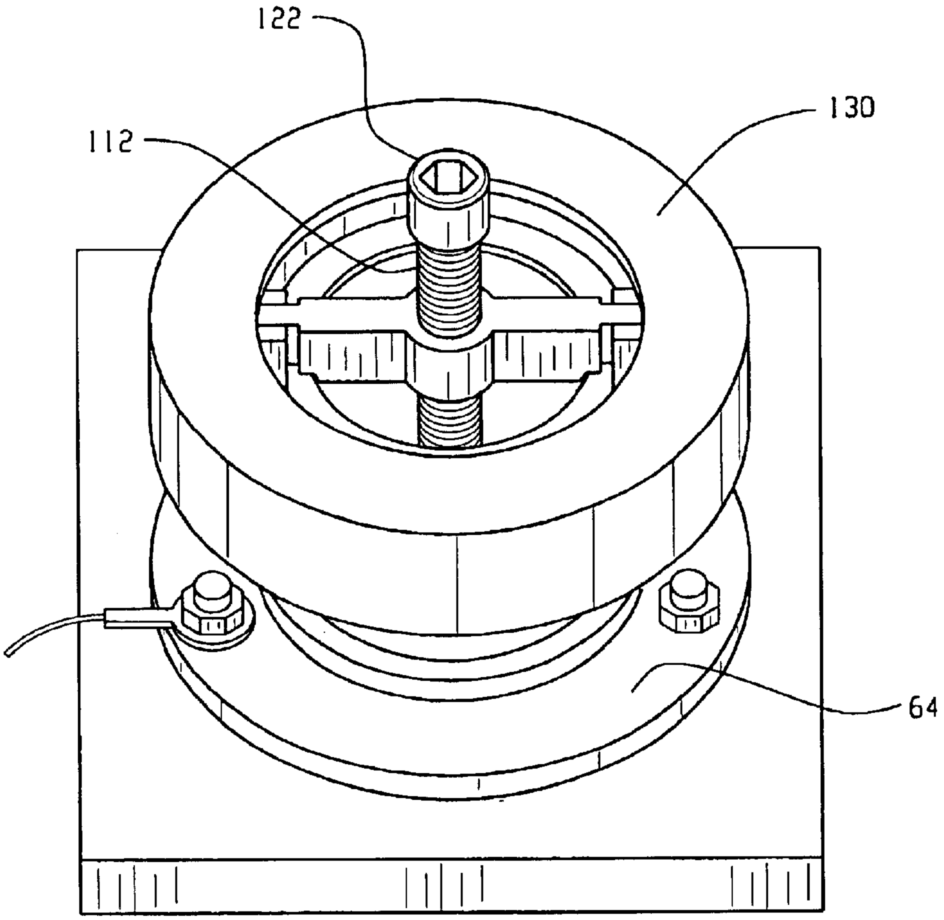
FIG. 18 represents removal of the seal sleeve and torque tool to allow the new poppet to seat.
Figure 19:
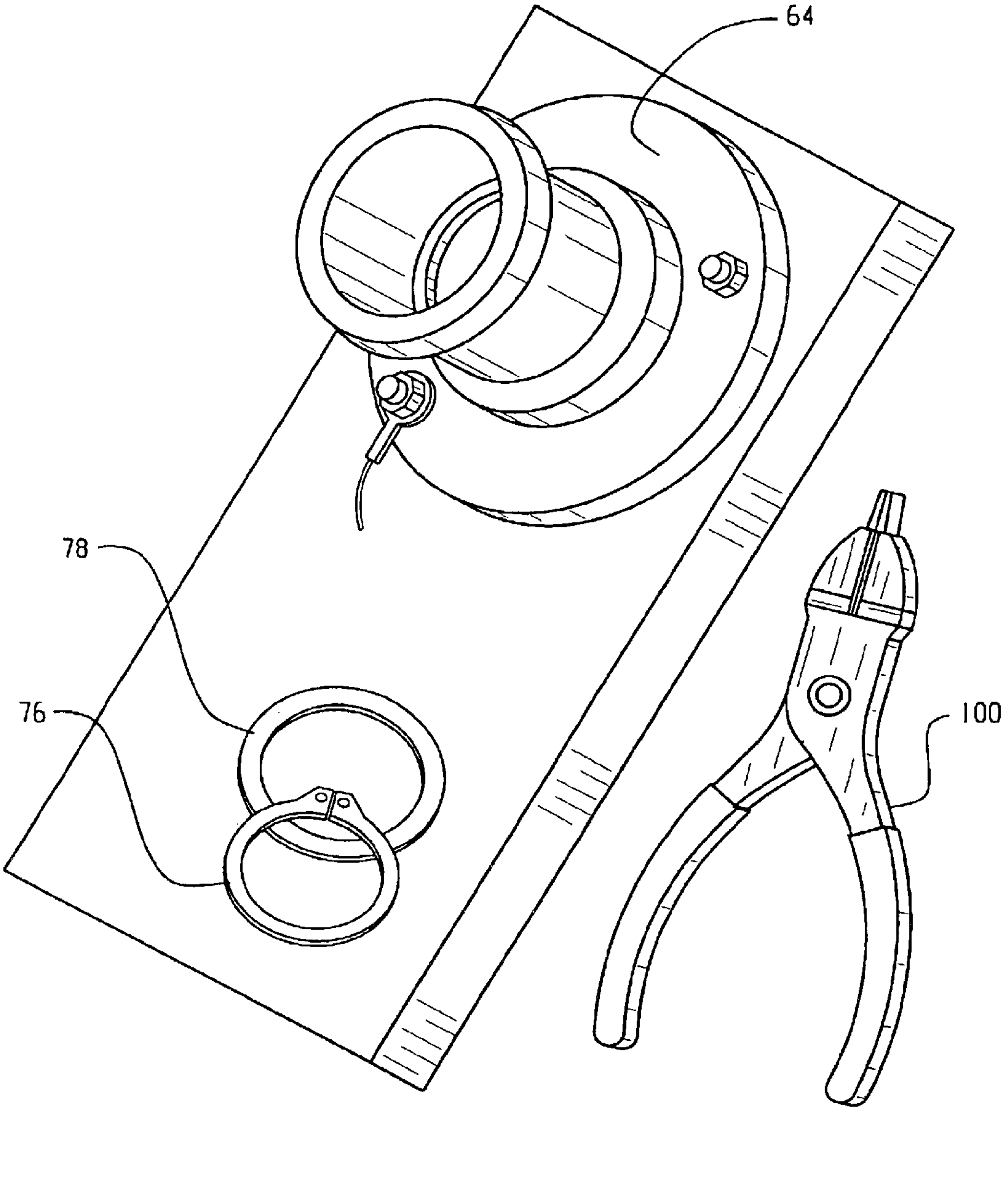
FIG. 19 illustrates removal of the retaining ring, valve poppet depression member, and installation of the retaining ring and optional retaining washer through the receptacle bore.

As illustrated in FIG. 18, the poppet depressing member 122 is then retracted so that the poppet body with the new seal engages the valve seat. Thereafter, the collar and poppet depressing tool are removed from the outer end of the receptacle as evidenced in FIG. 19. The seal retainer/ice scraping member 76 (if provided) is axially inserted through the receptacle bore and thereafter the retaining ring 78 positioned in place through the bore and into engagement with the associated groove on the poppet body.

As will be appreciated, replacement of the seal occurs without having to remove the receptacle from the vehicle, tank, bulkhead, wall, etc. The kit of FIG. 5 allows seal replacement to be achieved in a few minutes time whereby maintenance and servicing of the valve seal is accomplished at minimal cost.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An assembly for replacing a seal of an associated fluid coupling receptacle without removing the receptacle from an associated housing structure, the coupling including a receptacle body having a through bore end a poppet member carrying a seal disposed in the bore, the seal selectively engaging a valve seat in the body for precluding fluid flow through the receptacle body, the assembly comprising:

a poppet depressing member configured for mounting on the body and extending through the bore into selective engagement with the poppet member;

a seal removing member that selectively engages a worn seal through the bore when the poppet member is spaced from the valve seat via the poppet depressing member; and a seal advancing member for inserting a new seal over the poppet member after removal of the worn seal therefrom.

2. The assembly of claim 1 wherein the poppet depressing member includes at least one pivotal locking member that selectively engages an outer end of the body for securing the poppet depressing member thereto.

3. The assembly of claim 2 wherein the poppet depressing member includes a second pivotal locking member, the first and second pivotal members located adjacent opposite ends of a central portion that spans across the bore of the body.

4. The assembly of claim 3 wherein the poppet depressing member includes a threaded member extending from the central portion that is selectively advanced and retracted through the bore into selective engagement with the poppet member for moving the poppet member relative to the valve seat.

5. The assembly of claim 2 further comprising a restraining member that cooperates with the poppet depressing member and engages the at least one pivotal locking member to retain the poppet depressing member on the body.

6. The assembly of claim 5 wherein the restraining member is an annular collar received over the poppet depressing member.

7. The assembly of claim 1 wherein the seal removing member includes a finger configured for engaging receipt with the seal on the poppet member.

8. The assembly of claim 7 wherein the seal removing member includes first and second members pivotally joined together, the first member dimensioned for receipt through the bore from an open end of the body with the poppet depressing member mounted on the body, and the second member extending at an angle relative to the first member so that leveraged seal extracting forces can be applied thereto for removal of the worn seal.

9. The assembly of claim 1 wherein the seal advancing member includes a sleeve having an elongated recess allowing installation of the seal advancing member into the bore when the poppet depressing member is mounted to the body.

10. A method of replacing a worn seal of a fluid coupling, the coupling including a body having a bore extending inwardly from an open end thereof and a poppet member carrying a seal received in the bore that selectively engages a valve seat, the method comprising the steps of:

moving the poppet member from the valve seat through the open end of the bore;

advancing a tool member for selectively engaging the worn seal through the open end of the bore;

extracting the worn seal from the poppet member;

advancing a new seal through the bore from the open end thereof:

advancing a tool member for inserting the new seal;

installing the new seal on the poppet member; and allowing the poppet member to freely move relative to the valve seat.

11. The method of claim 10 comprising the further step of allowing the poppet member to engage the valve seat after removal of the worn seal therefrom.

12. The method of claim 10 wherein the worn seal extracting step includes engaging a minor peripheral portion of the worn seal and axially pulling the peripheral portion toward the open end of the bore whereby the remainder of the seal is removed from the poppet member.

13. The method of claim 10 wherein the installing step includes incrementally advancing the new seal through the bore and over the poppet member by step advancing the new seal and poppet member.

* * * * *